United States Patent [19]

Lee et al.

[11] Patent Number: 5,703,994
[45] Date of Patent: Dec. 30, 1997

[54] INDEX PROCESSOR FOR DIGITAL VCR AND METHOD THEREFOR

[75] Inventors: Doo Hee Lee, Kyungki-do; Tae Seok Yang, Seoul, both of Rep. of Korea

[73] Assignee: LG Electronics Inc., Seoul, Rep. of Korea

[21] Appl. No.: 511,602

[22] Filed: Aug. 4, 1995

[30] Foreign Application Priority Data

Aug. 10, 1994 [KR] Rep. of Korea .................. 19680/1994

[51] Int. Cl.$^6$ .................................................. H04N 5/76
[52] U.S. Cl. ...................... 386/52; 386/69; 386/95
[58] Field of Search ............................. 358/335; 360/32, 360/14.1, 14.2, 14.3, 18, 48, 72.1, 72.2, 27, 72.4; 386/83, 52, 69, 95; H04N 5/76

[56] References Cited

U.S. PATENT DOCUMENTS

| | | | |
|---|---|---|---|
| 5,390,027 | 2/1995 | Henmi et al. | 386/83 |
| 5,541,738 | 7/1996 | Mankovitz | 386/83 |
| 5,543,929 | 8/1996 | Mankovitz et al. | 386/83 |
| 5,546,191 | 8/1996 | Hibi et al. | 386/83 |

*Primary Examiner*—Tommy P. Chin
*Assistant Examiner*—Luanne Din
*Attorney, Agent, or Firm*—John P. White

[57] ABSTRACT

An index processor and processing method for digital VCR including the steps of: normally recording a user-selected program on video tape in a general recording mode; recording an index input after the program is recorded in an index recording mode, succeeding the end of a final program; normally reproducing a program recorded on video tape in a general playback mode; and reproducing the user-selected program according to the index recorded on video tape in the index reproducing mode, and recording a modified index.

8 Claims, 10 Drawing Sheets

| SYNC | ID | INDEX START CODE | PARITY |
|------|----|------------------|--------|
| SYNC | ID | INDEX DATA | PARITY |
| . | . | . | . |
| . | . | . | . |
| . | . | . | . |
| SYNC | ID | INDEX DATA | PARITY |
| SYNC | ID | INDEX END CODE | PARITY |

ONE TRACK OR BELOW ONE TRACK

INDEX PROCESSOR FOR DIGITAL VCR AND METHOD THEREFOR

BACKGROUND OF THE INVENTION

The present invention relates to an index processor for digital VCR and a method therefor, in which an index data format and recording data format are held commonly in hardware, facilitating high-speed index search.

Figure 1:
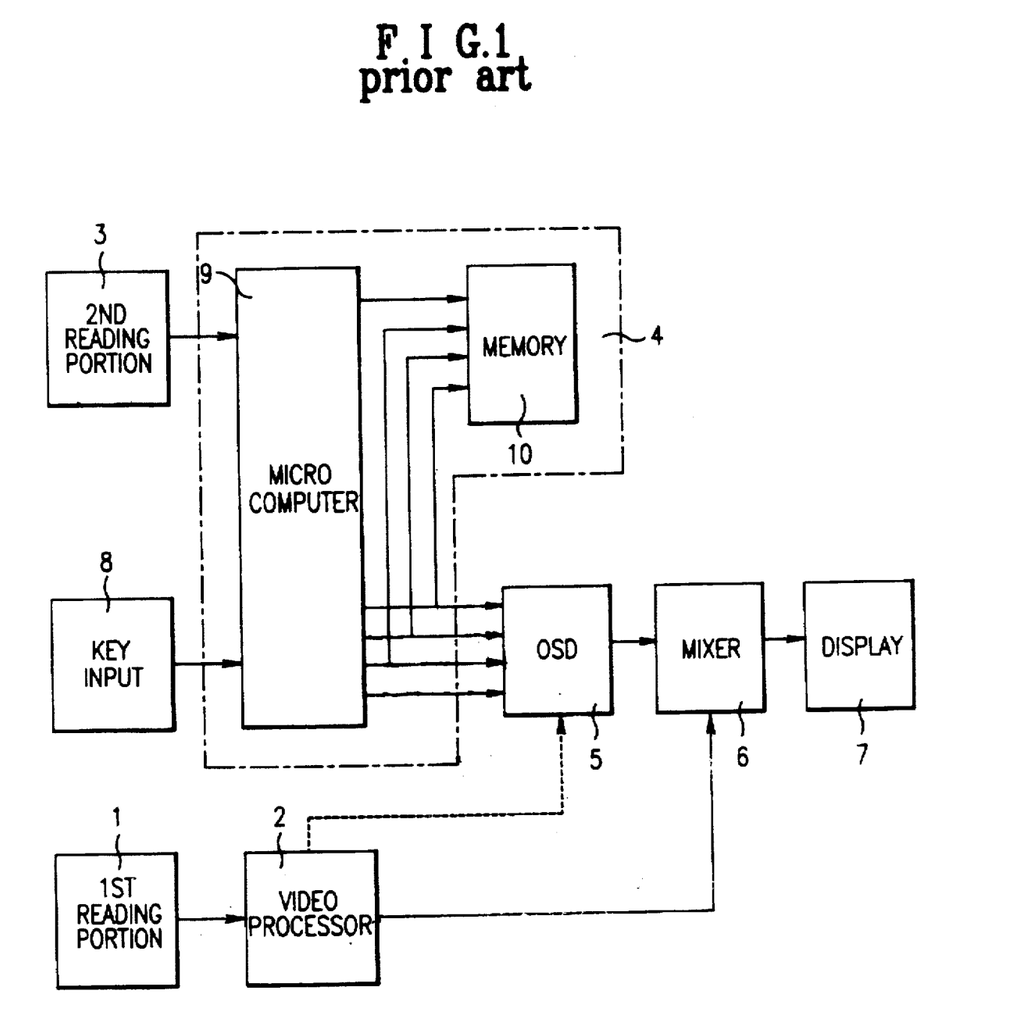
FIG. 1 is a block diagram of one example of a conventional index processor for digital VCR.

As shown in FIG. 1, one example of a conventional index processor for digital VCR includes a key input 1 for receiving a key signal input by a user, a first reading portion 1 for reading out information recorded in the recording section of a recording medium, a video processor 2 for processing information read out by first reading portion 1, a second reading portion 3 for reading information recorded in the non-recording section of the recording medium, a decoder 4 made with a microcomputer 9 and memory 10 and generating character information corresponding to the information read out by second reading portion 3, an OSD 5 for converting and displaying character information generated by decoder 4, and a mixer 6 for mixing a video signal generated by video processor 2 and a video signal generated by OSD 5 and applying the result to a video display 7. Here, a bar code scanner is used for second reading portion 3.

Figure 2:
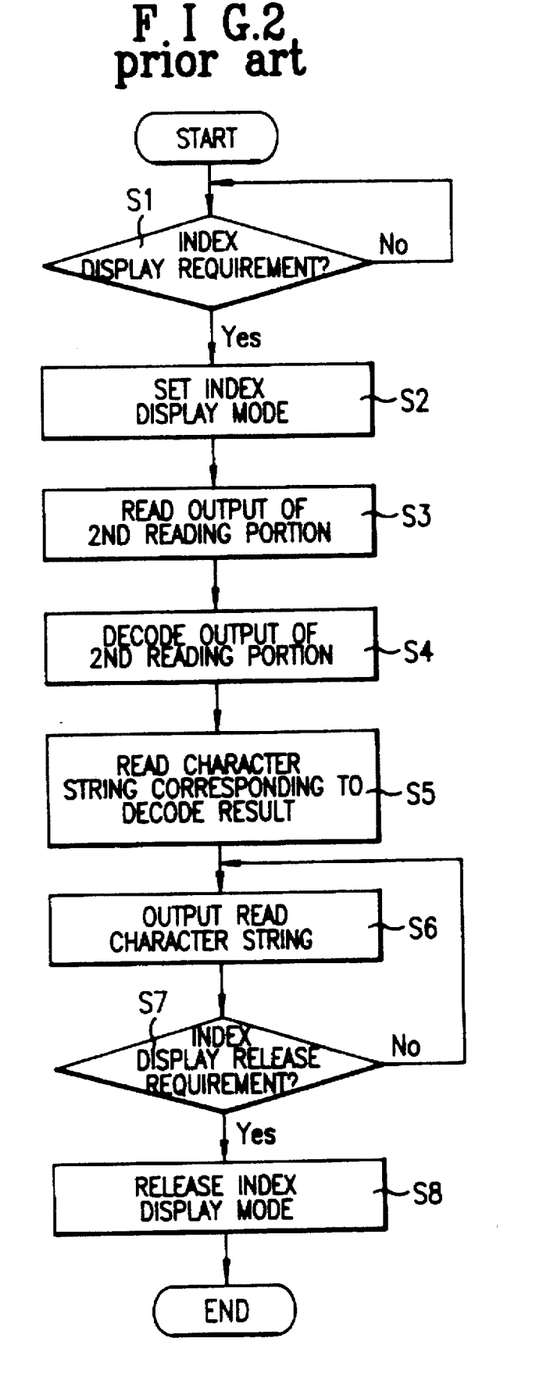
FIG. 2 is a flowchart of describing the index processor for VCR of FIG. 1.

The operation of the conventional index processor for digital VCR will be described below with reference to FIG. 2.

When a key signal is input to key input 8, it is detected whether it is an index display request for reading out information contained in the non-recording section of the recording medium in step $S_1$. If there is no index display request, the mode returns to the original state.

If there is the index display request, an index display mode corresponding thereto is established in step $S_2$. In step $S_3$ the output of second reading portion 3 is read by decoder 4. The output of second reading portion 3 is decoded therein in step $S_4$. In step $S_5$ a character string corresponding to the decoded result is read.

The character string corresponding to the decoded result is output to video display 7 via OSD 5 and mixer 6 in step $S_6$. In step $S_7$ it is detected whether there is an index display release request. If there is no index display release request according to the detection result, the mode returns to a step $S_{\ne}$ for outputting the read character string, repeating steps $S_6$ and $S_7$. If there is the index display release request, the index display mode is released in step $S_8$, finishing the operation.

In the conventional index processor for digital VCR, information itself is used as bar codes, limiting the storage capacity of information. In addition, this requires an additional device for reading the bar codes, which becomes uneconomical.

Figure 3:
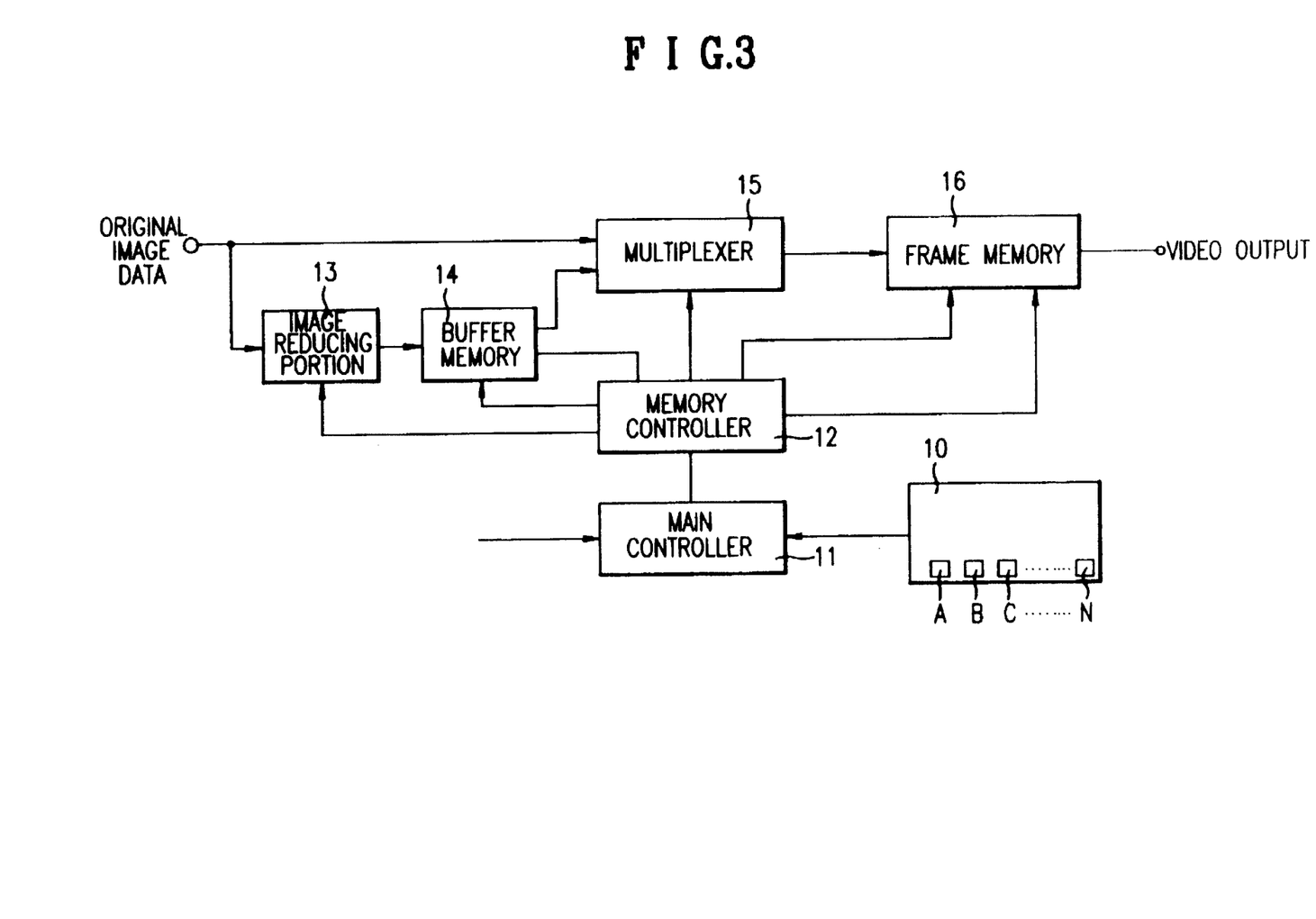
FIG. 3 is a block diagram of another example of a conventional index processor for digital VCR.

Meanwhile, as shown in FIG. 3, another example of a conventional index processor for digital VCR has an index mode setting portion 10 for setting VCR's modes selected by a viewer, a main controller 11 for controlling the whole system according to the output data of index mode setting portion 10 and the address data picked-up from the control track of a video tape, a memory controller for controlling a memory according to main controller 11, an image reducing portion 13 for reducing an image picked-up from the video tape according to memory controller 12, a buffer memory 14 for writing or reading the image data reduced in image reducing portion 13 according to a control signal output from memory controller 12, a multiplexer 15 for multiplexing original image data and the reduced image data output from buffer memory 14 according to a selector signal output from memory controller 12 and including the reduced image data into the original image data, and a frame memory 16 for outputting the image data output from multiplexer 15 according to the output signal of memory controller 12.

Figures 4A, 4B:
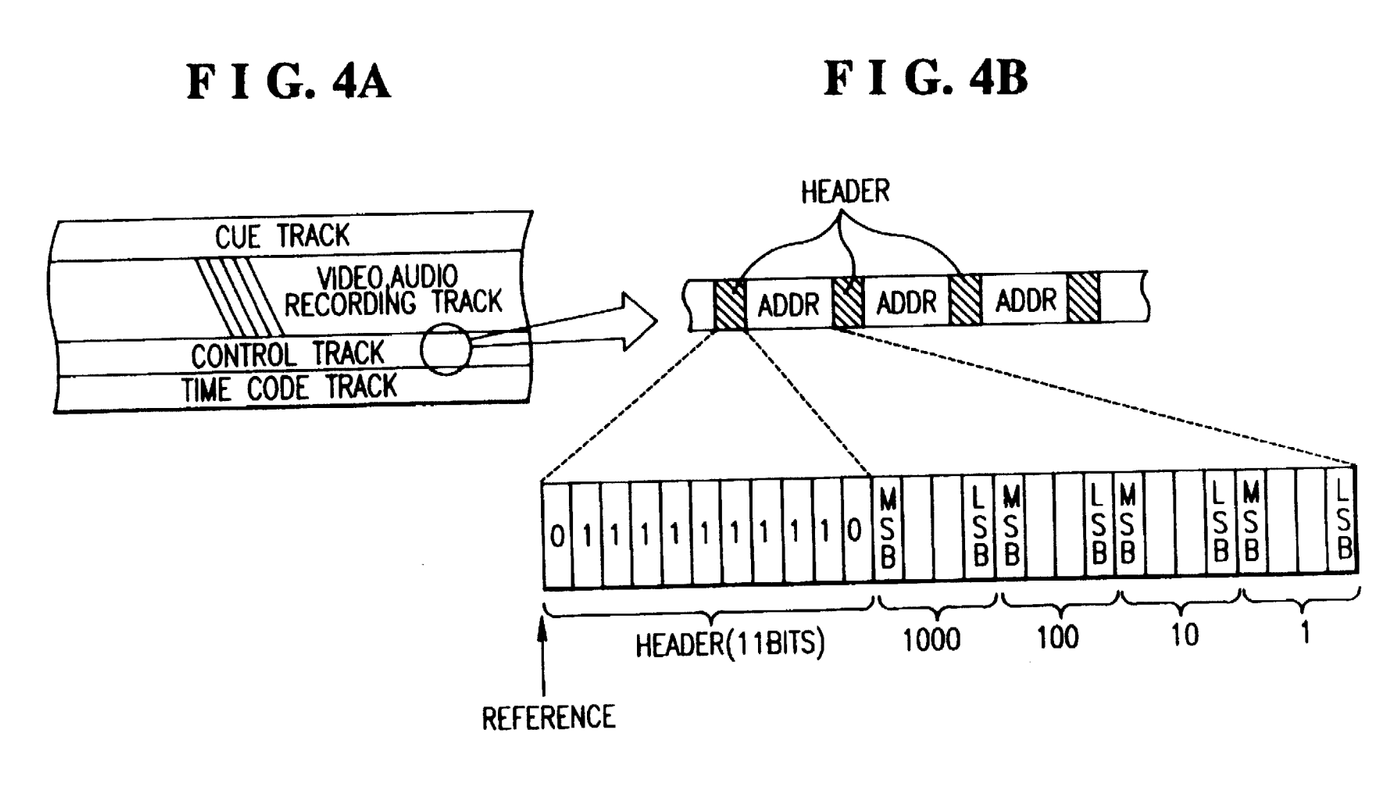
FIGS. 4A and 4B are diagrams of video tape format of FIG. 3.

A video tape consists of a recording track in which a video and audio signals are stored, time code track, control track, and CUE track, as shown in FIG. 4A. The control track is formed with a header and address, as shown in FIG. 4B. The header, a group of characters put at the head of digital information data, is used to discern the contents and features of data. The address, a mark for information stored in the memory, designates the position thereof. The operation of the second example of the conventional index processor for digital VCR will be explained below.

When a user designates indices on several portions of video tape and look for an intended index, main controller 11 controls memory controller 12 whenever an index switch is selected, according to the address data picked-up from the control track of video tape and the selection of the index search switch, thereby storing index image data in which the original image data is reduced according to image reducing portion 13 into buffer memory 14.

While the original image data is stored in the frame memory according to the control signal of memory controller 12 controlled by main controller 11, when the memory address of a set position of the reduced image arrives, image data selected by the index search switch out of the index image data stored in buffer memory 14 is stored in frame memory 16. The original image data and reduction stop image data stored in frame memory 16 are read out so that the reduction stop image is displayed on part of the original image to search the index designated by the user.

However, in the second example of the conventional index processor for digital VCR, header and address information signals, that is, digital information, must be recorded on the control track, uneconomically requiring an additional circuit for mixing and recording them with a servo control signal and separately reading out them.

SUMMARY OF THE INVENTION

Therefore, it is an object of the present invention to provide an index processor in which the format of index data is formed in the same as that of HDTV data, performing index search without an additional circuit for forming the format of index data and thereby increasing index search speed.

To accomplish the object of the present invention, there is provided an index processor for a digital VCR comprising: a sync detector for performing sync-detection so as to display data stored in video tape to an external device, or record an information signal displayed on the external device on the video tape; an inner error correction coding portion for inner-error-correcting a signal output from the sync detector so as to display the signal on the external device, or inner-error-correcting the information signal displayed on the external device so as to record it on the video tape, and outputting the result to the sync detector; an interleaving/deinterleaving portion for deinterleaving the signal output from the inner error correction coding portion so as to display the signal on the external device, or interleaving the information signal displayed on the external device so as to record it on the video tape, and outputting the result to the inner error correction coding portion; an outer error correction coding portion for outer-error-correcting the signal output from the interleaving/deinterleaving portion so as to display it on the external device, or outer-error-correcting the information signal displayed on the external device so as to record it on the video tape, and outputting the result to the interleaving/deinterleaving portion; and an index processing portion for repeatedly recording the interleaved index data output from the interleaving/deinterleaving portion on a specific portion of the video tape, and searching the index of video tape designated by a user from the signal output from the inner error correction coding portion.

For the object of the present invention, there is further provided an index processing method for digital VCR comprising the steps of: normally recording a user-selected program on video tape in a general recording mode; recording an index input after the program is recorded in an index recording mode, succeeding the end of a final program; normally reproducing a program recorded on video tape in a general playback mode; and reproducing the user-selected program according to the index recorded on video tape in the index reproducing mode, and recording a modified index.

DETAILED DESCRIPTION OF THE INVENTION

Hereinafter, a preferred embodiment of the present invention will be described with reference to the attached drawings.

Figure 5A:
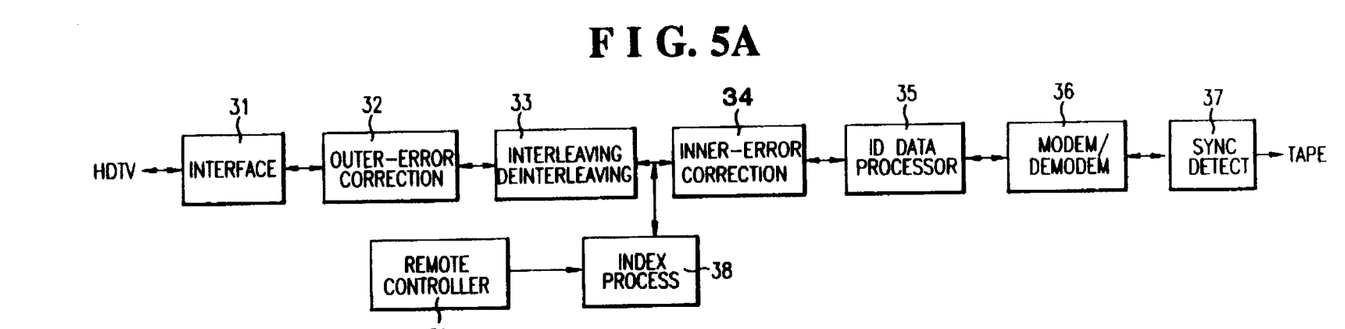
FIG. 5A is a block diagram of an index processor for digital VCR according to the present invention.

Referring to FIG. 5A, an embodiment of the index processor of the present invention comprises a sync detector 37, modem/demodem 36, ID data processor 35, inner error correction coding portion 34, interleaving/deinterleaving portion 33, outer error correction coding portion 32, interface 31, index processor 38, and remote controller 39.

Sync detector 37 sync-detects so as to display data stored in the video tape to an external device or record the information signal displayed on the external device and output from modem/demodem 36 on the video tape.

Modem/demodem 36 demodulates the signal output from sync detector 37 so as to display the data stored in the video tape on the external device and output it to ID data processor 35, or modulates information displayed on the external device so as to record it on the video tape and output the result to sync detector 37.

ID data processor 35 processes and outputs ID data to inner error correction coding portion 34 or modem/demodem 36 so as to display the data stored in the video tape to the external device or record the information displayed on the external device on the video tape.

Inner error correction coding portion 34 inner-error-corrects the signal output from sync detector 37 via modem/demodem 36 and ID data processor 35 so as to display the signal on the external device, or inner-error-corrects the signal output from interleaving/deinterleaving portion 34 so as to record the information signal displayed on the external device on the video tape. The error correction result is output to ID data processor 35 and sync detector 37 via modem/demodem 36 and ID data processor 35.

Interleaving/deinterleaving portion 33 deinterleaves the signal output from inner error correction coding portion 34 so as to display the signal on the external device, or interleaves the signal output from outer error correction coding portion 32 so as to record the information signal displayed on the external device on the video tape. The result is output to inner error correction coding portion 34.

Outer error correction coding portion 32 outer-error-corrects the signal output from interleaving/deinterleaving portion 33 so as to display it on the external device, or outer-error-corrects the signal output from interface 31 so as to record the information signal displayed on the external device on the video tape. The result is output to interleaving/deinterleaving portion 33.

Interface 31 couples the signal output from outer error correction coding portion 32 so as to display it on the external apparatus, or couples the information signal displayed on the external apparatus to outer error correction coding portion 32 so as to record it on video tape.

Index processor 38 repeatedly records the interleaved index data output from interleaving/deinterleaving portion 33 on a specific portion of the video tape so as to search the signal output from inner error correction coding portion 34 for an user-designated index of video tape.

Remote controller 39, having a jog shuttle key, designates a user-intended program, displays the title of a currently-reproduced program on the screen during reproduction, and outputs key signals to index processor 38 when the program title is to be input, modified or changed.

The operation of the index processor for digital VCR of the present invention will be explained below.

The index processor is formed bidirectionally so that the data of general HDTV data is recorded on the video tape and the data recorded on the video tape is reproduced and displayed on HDTV.

In case of reproducing data recorded on the video tape and displaying it on the screen of an HDTV, information data recorded on the video tape is detected as serial analog signals through sync detector 37. These detected analog signals are converted into digital via modem 36. The ID data is processed through ID data processor 35.

Through inner error correction coding portion 34 for compensating for errors generated in digital conversion, internally produced errors are compensated for. In order to render the burst error random, it is added to interleaving/ deinterleaving portion 33 so that the outer errors are corrected in outer error correction coding portion 32.

Data stored on video tape is displayed on the HDTV screen via interface 31 for coupling the output signal of outer error correction coding portion 32 and the HDTV.

In order to record HDTV data on the tape, the above-explained method is reversely performed. Specifically, the HDTV data is output to outer error correction coding portion 32 through interface 31 for the purpose of outer error correction. The error-corrected result is interleaved in interleaving/deinterleaving portion 33 and output to inner error correction coding portion 34.

Of the data inner-error-corrected in inner error correction coding portion 34, its ID data is processed in ID data processor 35 and modulated in modem/demodem 36. Its sync signal is detected in sync detector 37. Thereafter, the data is recorded on the video tape.

In the embodiment of the present invention, index processor 38 is inserted into the general HDTV digital data processor so that index data is used along with the video tape tracks.

Index processor 38 is added between interleaving/deinterleaving portion 33 and inner error correction coding portion 34 so that the index data is recorded on the helical scan track of the general video tape only by using inner error correction coding portion 34.

Figure 6A:
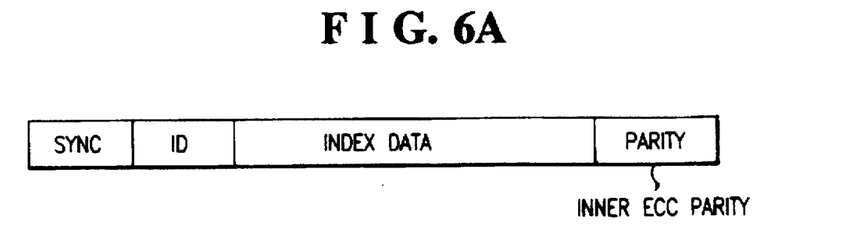
FIG. 6A is a diagram of sync blocks of the index data according to the present invention.
Figure 6B:
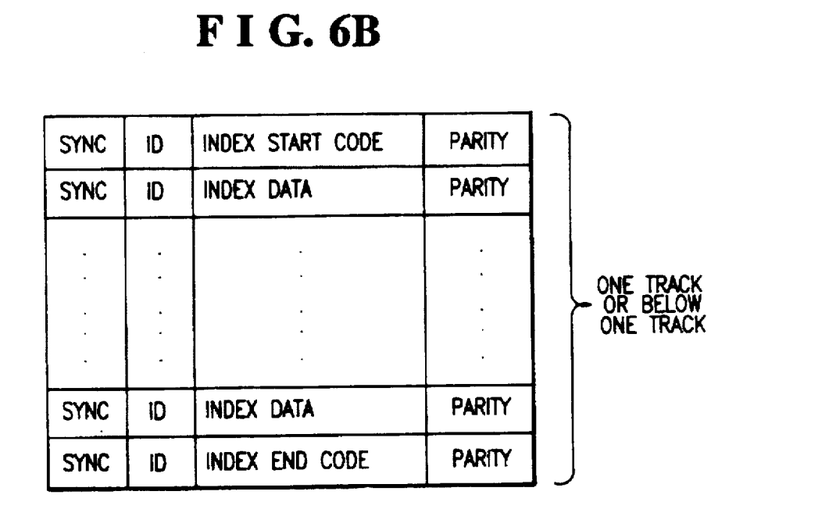
FIG. 6B is a diagram of index data frame according to the present invention.
Figure 6C:
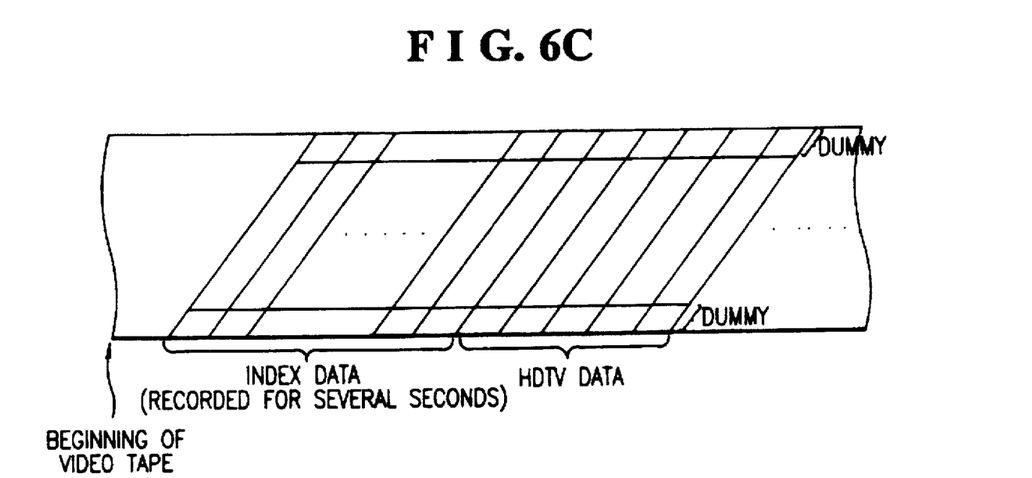
FIGS. 6C, 6D and 6E are diagrams in which the index data is recorded on the video tape according to the present invention.
Figure 6D:
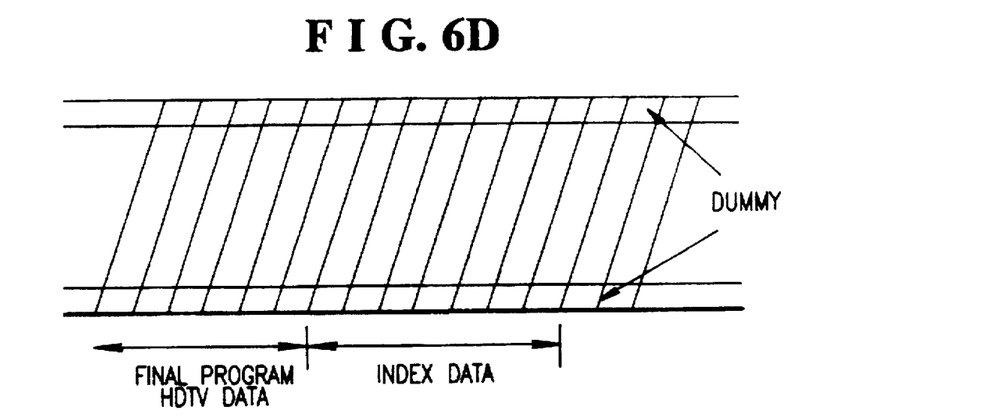

In other words, the index data repeatedly recorded at the beginning of the video tape or behind the program recorded at the end is repeatedly recorded for several seconds on one track or less there than on the helical scan track. Here, as shown in FIG. 6A, the index data consists of sync, ID data, index data, and inner error correction code parity. The index data is recorded at the beginning of the video tape or behind the program recorded at the end, for a predetermined time, as shown in FIGS. 6C and 6D.

Information contained in the index data is to on-screen-display the address and contents of a program recorded on the tape, dispensing with a lot of data. Therefore, at the beginning of the index data an index start code is added, an index end code at the end thereof. The index data is repeatedly recorded at the beginning of the tape or behind the program recorded at the end for several seconds on one track or less than one track.

Accordingly, in the present invention, the index data is repeatedly recorded on a specific portion of the video tape to secure time to stabilize servo. In addition, unlike a general digital data structure, error-free data can be read without through error correction coding portion 32 and interleaving/deinterleaving portion 33.

Figure 6E:
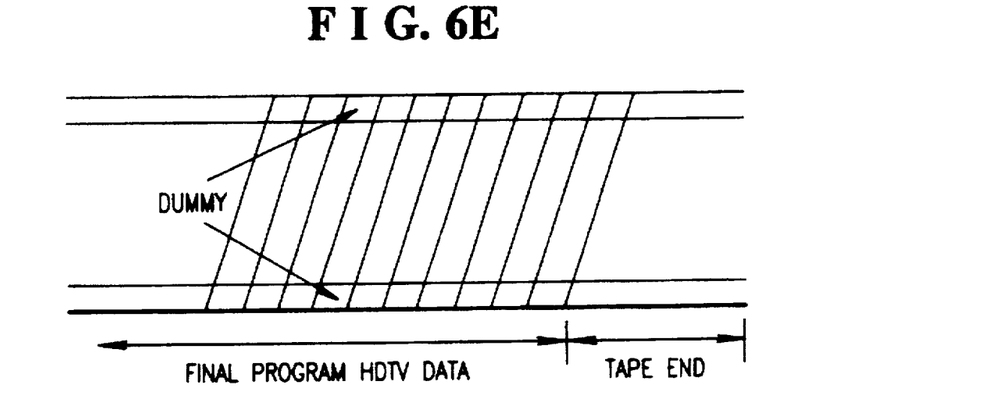

Here, in order to read the index data, the video tape must be placed where the index data is present. Therefore, the video tape must be extracted from where the index data is present, from the VCR. In case that the index data is recorded behind the final program, the video tape must be extracted while it is rewound until where the index data starts. In case that the index data is recorded at the beginning of the video tape for lack of video tape, the video tape must also be rewound until where the index data starts. In FIG. 6C, the index data is recorded in front of the video tape. FIG. 6D shows a case that the index data is recorded behind the final program. FIG. 6E shows a case that there is no section to record the index data when it is supposed to be recorded behind the final program. In this situation, the index data is recorded at the beginning of the video tape, as shown in FIG. 6A.

Figure 7A:
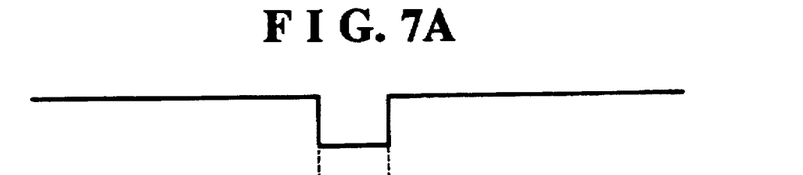
FIGS. 7A, 7B and 7C are diagrams of the waveforms of a signal indicative of the end of the video tape.
Figure 7B:
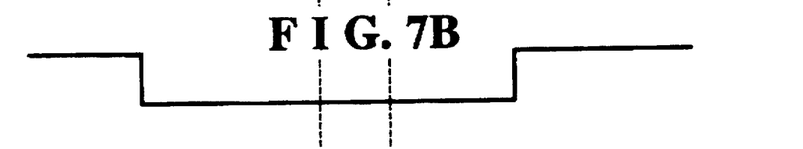
Figure 7C:
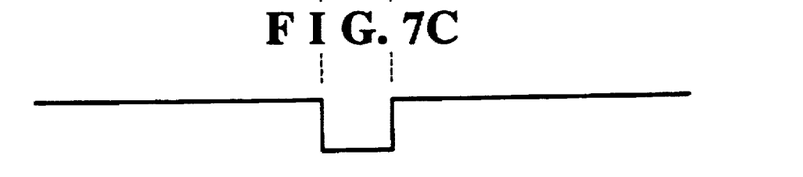

FIG. 7A illustrates a case that a signal indicative of the end of video tape is input to microcomputer 42 in serial data form from the system controller, and microcomputer 42 in turn outputs a low signal for a moment. FIG. 7B shows time to record the index data on video tape. Here, when the signal of FIG. 7A is input, the signal of FIG. 7C is output with the two signals of FIGS. 7A and 7B so that video tape is rewound to record the index data at the beginning thereof. This prevents video tape from being damaged due to dust. Through the above process, the index data is inserted into the tracks of video tape via index processor 38.

Figure 5B:
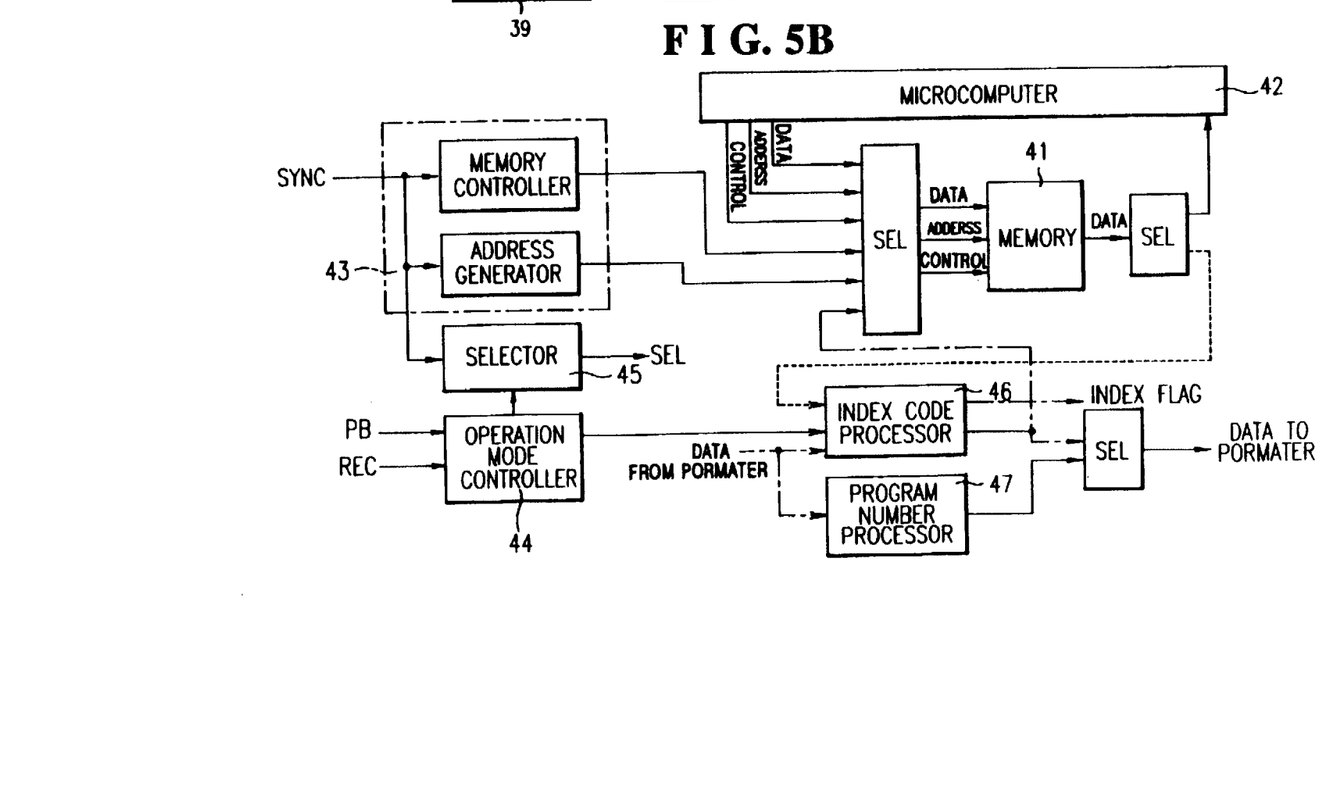
FIG. 5B is a block diagram of the index processor of FIG. 5A.

As shown in FIG. 5B, index processor 38 comprises a memory 41 for storing the index data recorded on the video tape, a microcomputer 42 for controlling an OSD for displaying the index data recorded on the video tape when the user designates desired index data, and outputting a control signal so that the index data recorded on the video tape is read and stored in memory 41, a memory controller 43 for re-recording the index data stored in memory 41 on the video tape via microcomputer 42 according to the sync detection signal of video tape, or generating control and address signals for controlling memory 41 so as to decode the index data recorded on the video tape, an operation mode controller 44 for controlling various operation modes of VCR, a selector 45 for selecting corresponding data out of data recorded on the video tape according to the control of operation mode controller 44, an index code processor 46 for decoding or encoding a plurality of specific codes in the index data decoded in memory 41 according to the respective operation modes of operation mode controller 44, and outputting an index flag signal, and a program number processor 47 for increasing the number of program currently displayed according to the operation modes of VCR by one to record it on a formatter, or reading the position of the currently displayed program.

The operation of the index processor of the present invention will be explained below.

When the user designates the index of a program and display a desired index, data is transmitted to memory 41 according to microcomputer 42 in order to record or store index data on the tape.

According to the control signal of operation mode controller 44 for controlling the operation mode of selector 45 and index code processor 46 depending upon the operation mode PB or REC of VCR, selector 45 generates a selection signal for converting the signal path of the operation mode PB or REC along with the microcomputer and interface, and at the same time, generates a control signal for selecting one of index data, HDTV data, program number recorded on the video tape of the formatter.

Index code processor 46 decodes the start code and end code of the index data and reads the index data. When the read index data is read completely, an index flag signal is generated.

In the mode REC, reversely from the sequence of the operation mode PB, index code processor 46 reads the index data of memory 41 and provides the start code and end code, forming an index data frame. The thus formed frame is transmitted to the formatter so that the index data is recorded. With the index information and the information of the program number currently played, index search is performed.

When the user inputs the number of a program recorded on the tape and the number of a program to be displayed, using a video index search system signal used in the conventional VCR, the difference therebetween is calculated to count the video index search system signal as much as the difference, and a program to see is displayed.

Figure 8:
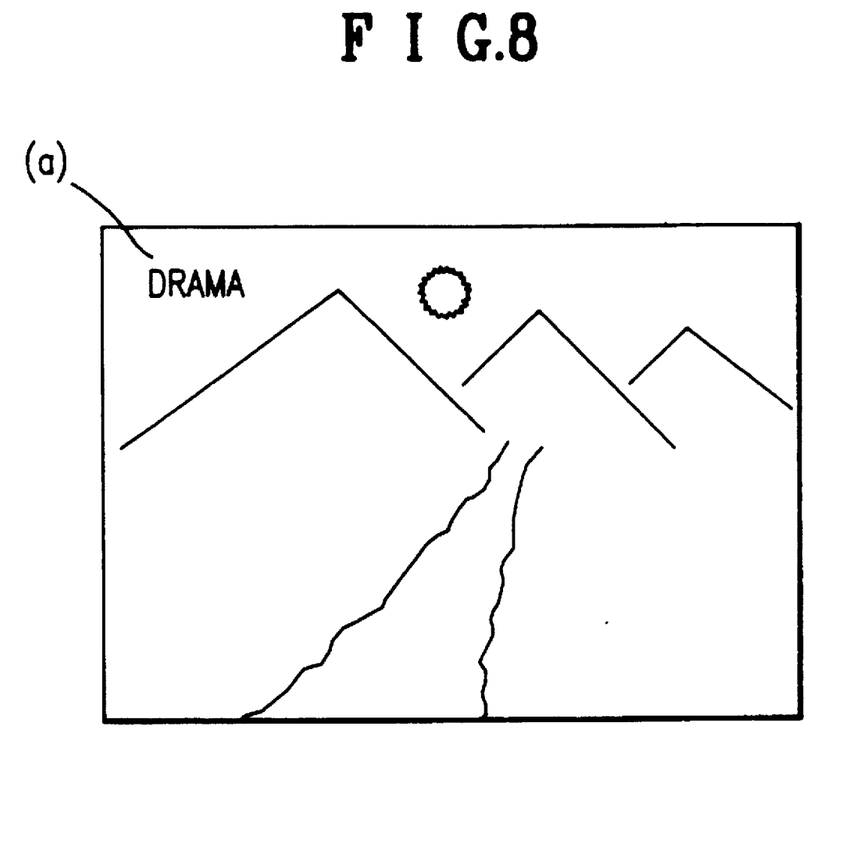
FIG. 8 illustrates a state in which the title of a currently-reproduced program is displayed.

If a user wants to display a currently reproduced program on the screen while he or she moves to a program to see, then the title of the currently reproduced program is displayed in the upper portion of the screen, as shown in FIG. 8. Index search can be treated with the remote controller or a panel key attached to the VCR. Using the remote controller, the modified index data can be recorded at the beginning of the tape in the reproducing mode.

Figure 9:
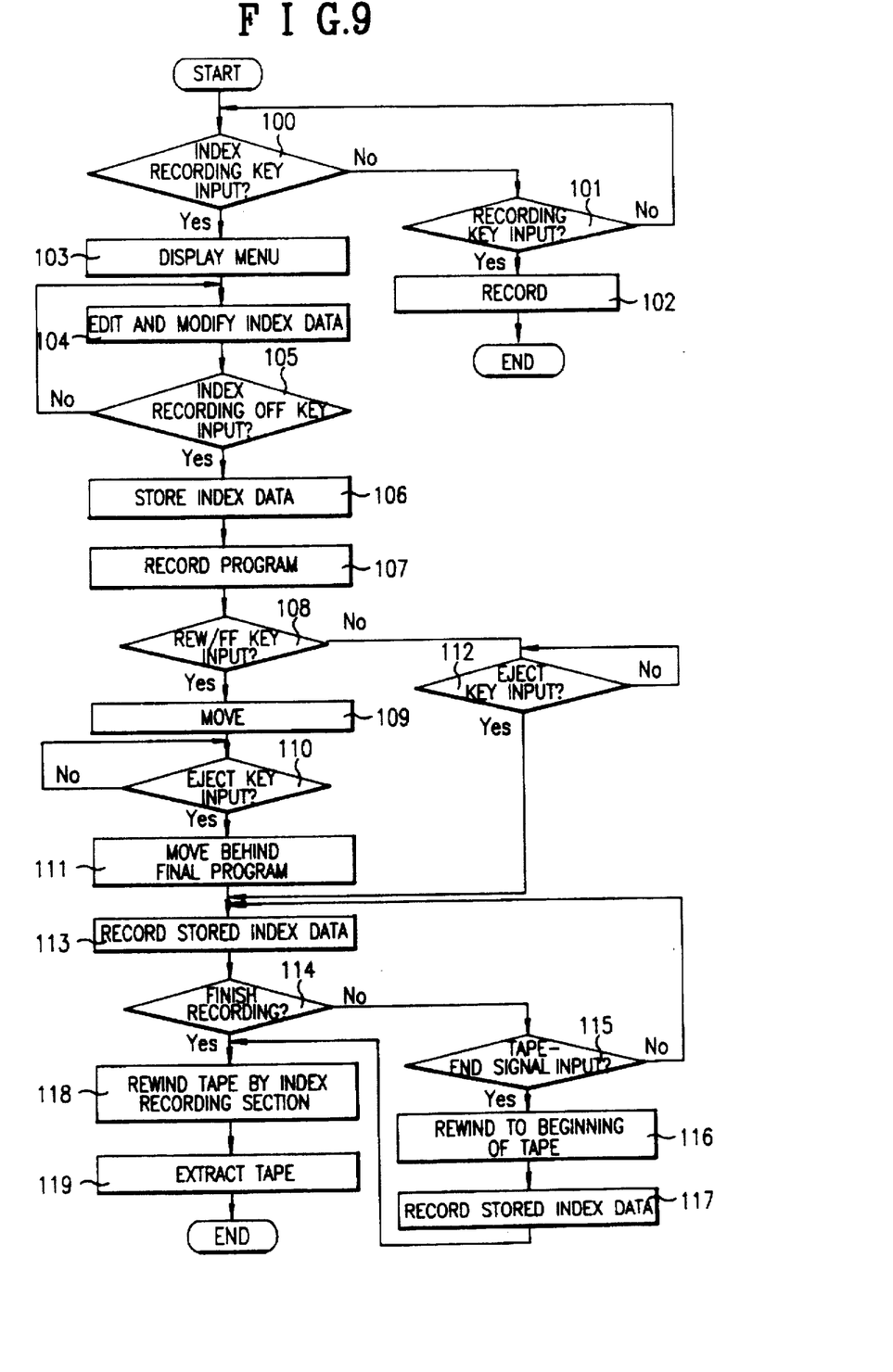
FIGS. 9 and 10 are flowcharts of explaining the index process for digital VCR of the present invention.
Figure 10:
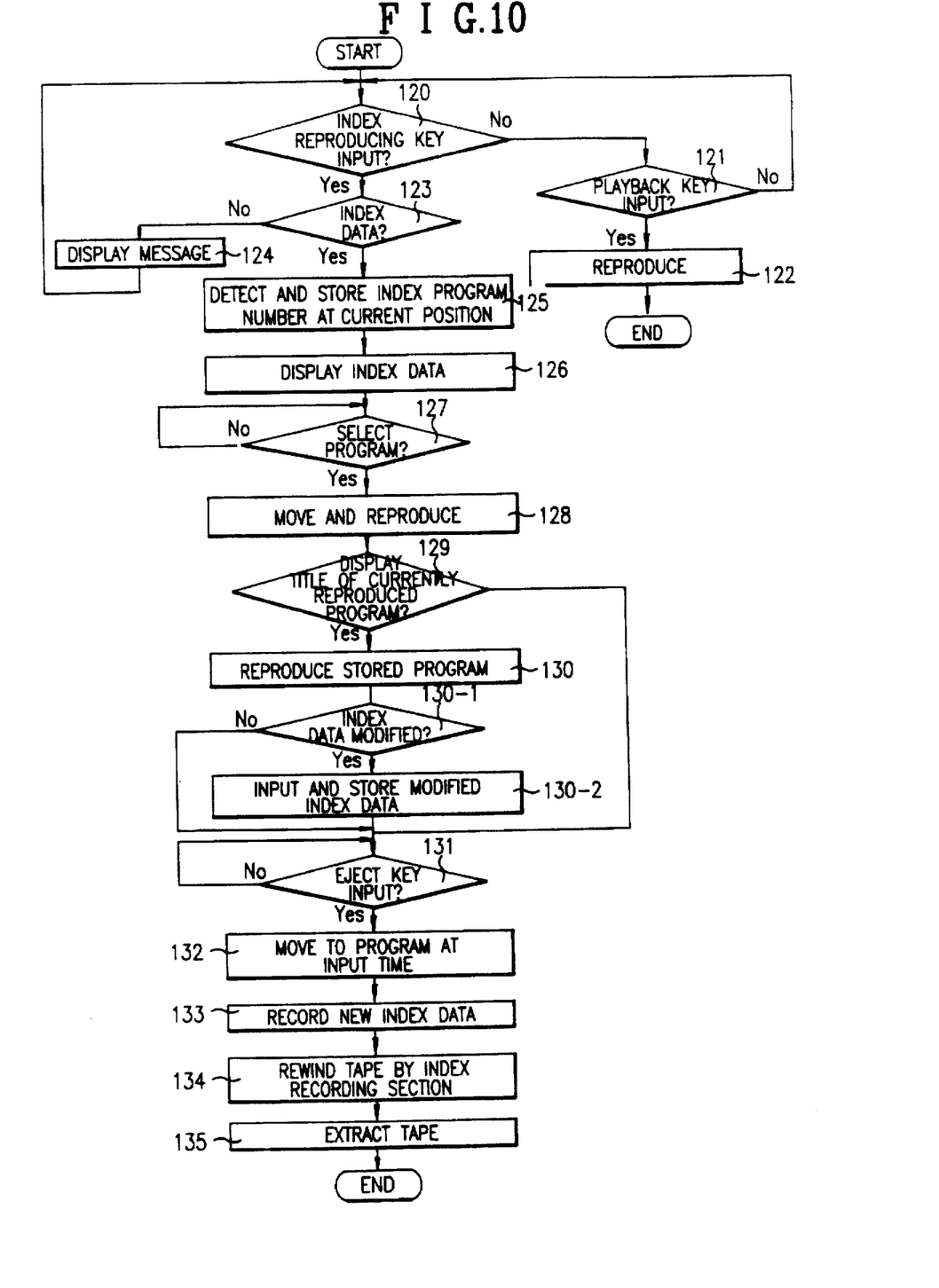

The index processing for VCR of the present invention will be described below with reference to FIGS. 9 and 10 showing a process in the recording mode and a process in the reproducing mode, respectively.

Referring to FIGS. 9 and 10, the index processing for VCR of the present invention comprises the steps of normal recording (steps 101 and 102), index/program recording (steps 100, 103–114, 118 and 119), normal reproducing (steps 121 and 122), and index/program reproducing (steps 120, 123–128, and 131–135).

In the normal recording steps, a user-designated program is recorded normally on video tape in a general recording mode. Specifically, when the user selects a recording key, not an index recording key, after the VCR power is ON, video and audio data is recorded in the normal recording mode.

In more detail, as shown in FIG. 9, if the index recording key is not input, it is detected whether the recording key is input or not in step 101. If so, the program is recorded normally in step 102. If the recording key is not input, the procedure returns to the initial step of detecting whether the index recording key is input or not.

In the index/program recording steps 100, 103–114, 118 and 119, the index is recorded at the end of the final program after the program is recorded in the index recording mode.

The index/program recording step includes substeps of editing, modifying and storing (steps 100, 103, 104, 105 and 106) the index in the index recording mode, recording (step 107) a user-designated program, moving (steps 108, 109, 110, 111 and 112) to the end of the final program when the eject key is input, recording (steps 113, 114 and 115) the index stored on the video tape until the end of the video tape, recording (steps 116 and 117) the index stored at the beginning of the video tape when the end of video tape arrives, and rewinding (steps 118 and 119) the video tape for the index recording section and extracting the video tape after the index recording steps.

Here, the index editing step comprises substeps of displaying (steps 100 and 103) the menu in the index recording mode, editing or modifying (step 104) the index according to the menu displayed using the jog shuttle key, and storing (step 106) the edited or modified index if the index recording is finished and the index recording-off key is input in step 105.

After the index is stored, the procedure goes to program recording step 107 in which the user records a desired program on the video tape. In the moving-to-end step succeeding the finish of program recording, it is detected whether the REW/FF key is input or not in step 108. If so, the video tape moves by a predetermined distance in step 109. If the eject key is input in step 110, the video tape moves behind the final program and to index recording-at-end step 111. If the eject key not the REW/FF key is input according to the detection result, the procedure goes directly to the index recording-at-end step 112.

The index is supposed to be recorded after finishing recording the program. However, if the user presses the REW/FF key prior to recording the index and selects the eject key after the video tape moves to other portion, the video tape must be moved behind the final program and then the index be recorded. If the REW/FF key is not selected, the index is recorded where the program is finally recorded. After the index is recorded, the video tape is rewound as long as the index recording section, and then extracted.

In the index recording-at-end step, the stored index data is recorded (step 113) at the end of the program. During recording (step 114) it is detected (step 115) whether the current position is the end of the video tape or not. If not, the stored index data is continuously recorded at the end of the program. If the end of video tape arrives, the procedure goes to the index recording-at-beginning step.

In the index recording-at-beginning step, it is detected (step 115) whether the current position is the end of video tape or not during recording. If the end of video tape arrives, the video tape is rewound (step 116) to the beginning thereof. Then the index stored at the beginning of the video tape is recorded (step 117).

In other words, during recording the index behind the final program of video tape, when a signal indicative of the end of video tape is input, the microcomputer applies the signal indicative of the end of video tape to rewind the video tape until its beginning.

After the index recording-at-end and recording-at-beginning steps, the video tape extracting step is performed. In this step, when the index is recorded on video tape, video tape is rewound (step 118) as long as the index recording section in which the index is recorded, and then extracted (step 119).

In the normal reproducing step, a program recorded on video tape is normally reproduced in the general reproducing mode. More specifically, if the VCR power is ON and then the user selects the playback key not the index reproducing key, the normal program playback mode is performed to reproduce video and audio data.

In other words, as shown in FIG. 10, if the index reproducing key is not input, it is detected (step 121) whether the playback key is input or not. If the playback key is input, the program is normally reproduced (step 122). If not, the procedure goes to the step of detecting whether the index playback key is input or not.

In the index/program reproducing step, a program selected by the user is reproduced according to the index recorded on the video tape in the index reproducing mode, and a modified index is recorded.

This index/program reproducing step includes the substeps of detecting and displaying (steps 120, 123, 124, 125 and 126) index data in the index reproducing mode, selecting and reproducing (steps 127 and 128) a program according to the displayed index, displaying (steps 129 and 130) the title of a program on the upper portion of the screen if the user wants, storing (steps 130-1 and 130-2) a new index if the user requires index data modification and inputs the new index, moving to where the index is recorded on the video tape if the eject key is input, and recording (steps 131, 132 and 133) the stored new index, and rewinding the video tape as long as the index recording section and extracting (steps 134 and 135) the video tape.

Here, the index displaying step includes the substeps of detecting (steps 120 and 123) whether the index is present or not in the index reproducing mode, displaying (step 124) a corresponding message if there is no index, detecting and storing (step 125) the index program number at the current position if the index is present, and displaying (step 126) the stored index.

In other words, if the user selects the index reproducing key, it is discriminated in steps 120 and 123 whether the current video tape has index information. Here, if the index information is not found, message "index data failed" is displayed, and the procedure goes to the initial stage in step 124.

If there is index information according to the index information discrimination result, the index program number at the current position is detected and stored in a circuit in step 125. After those serial steps, the index is displayed on the screen in step 126.

When the user selects a desired program using the jog shuttle key of the remote controller in step 127 while watching the index displayed on the screen, the video tape moves to where the desired program is placed, using a VISS signal in step 128.

During playback, if the user wants to display the title of a currently reproduced program on one portion of the screen in step 129, the stored program title is displayed on one upper portion of the screen in step 130. If the user requires index data modification and inputs a new index, the new index is stored in steps 130-1 and 130-2. Here, if the user inputs the eject key in step 131 in order to extract the video tape, the video tape moves to the program placed at the time of input in step 132, and a new index containing the modified index data is recorded on video tape in step 133. Then the video tape is rewound as long as the index recording section in step 134, and the video tape is extracted in step 135.

As described above, the present invention has the following advantages.

First, the recording data format and index data format of a general video tape are formed in the same way to be commonly used on the tracks of a conventional video tape. This can be employed in the digital VCR.

Second, the present invention uses the conventional video index search system function, reducing the number of circuits as compared with the conventional index search system. Further, in the present invention, the VISS signal used in the general VCR is utilized without change, which is cost-effective.

What is claimed is:

1. An index processing method for a digital VCR comprising the steps of:

editing index data in an index recording mode according to a user designation;

recording the index data on the end portion of a program when the program has been recorded on an index recording region;

moving to the recording region of the index data recorded on a video tape when an eject key is input; and reproducing a user-selected program according to the index data recorded on the video tape in an index reproducing mode, and recording a modified index.

2. An index processing method for digital VCR as claimed in claim 1, wherein said index/program recording step comprises the steps of:

editing, modifying and storing the index in the index recording mode;

recording a user-designated program;

moving to the end of the final program when an eject key is input;

recording the index stored on the video tape until the end of the video tape;

recording the index stored at the beginning of the video tape when the end of video tape arrives; and rewinding the video tape for the index recording section and extracting the video tape after the index recording steps.

3. An index processing method for digital VCR as claimed in claim 2, wherein said index editing step comprises the steps of:

displaying a menu in the index recording mode;

editing or modifying the index according to the menu displayed; and storing the edited or modified index if the index recording is finished.

4. An index processing method for digital VCR as claimed in claim 2, wherein said moving-to-end step comprises the steps of:

detecting whether a REW/FF key is input or not;

moving the video tape by a predetermined distance if the REW/FF key is input;

moving the video tape behind the final program and to an index recording-at-end step if an eject key is input; and going directly to the index recording-at-end step if the eject key not the REW/FF key is input according to the detection result.

5. An index processing method for digital VCR as claimed in claim 2, wherein said recording-at-end step comprises the steps of:

recording stored index data at the end of the program;

detecting whether the current position is the end of the video tape or not during recording;

continuously recording the stored index data at the end of the program if the current position is the end of video tape; and going to an index recording-at-beginning step if the end of video tape arrives.

6. An index processing method for digital VCR as claimed in claim 1, wherein said index/program reproducing step comprises the steps of:

detecting and displaying index data in the index reproducing mode;

selecting and reproducing a program according to the displayed index;

displaying the title of a program on the upper portion of the screen if the user wants;

storing a new index if the user requires index data modification and inputs the new index;

moving to where the index is recorded on the video tape if the eject key is input, and recording the stored new index; and rewinding the video tape as long as the index recording section and extracting the video tape.

7. An index processing method as claimed in claim 6, wherein said index displaying step comprises:

detecting whether the index is present or not in the index reproducing mode;

displaying a corresponding message if there is no index;

detecting and storing the index program number at the current position if the index is present; and displaying the stored index.

8. An index processing method for digital VCR as claimed in claim 2, wherein said recording-at-beginning step comprises the steps of:

rewinding the video tape to the beginning thereof if the end of video tape arrives; and recording the index stored at the beginning of the video tape.

* * * * *